United States Patent
Witt

[11] 4,021,935
[45] May 10, 1977

[54] FLIGHT TRAINING HOOD

[76] Inventor: Frank Witt, Rt. No. 4 Hidden Acres, Lexington, S.C. 29072

[22] Filed: Feb. 20, 1976

[21] Appl. No.: 659,906

[52] U.S. Cl. .................................. 35/12 G; 2/6; 35/12 B; 35/12 N; 350/160 LC
[51] Int. Cl.² ........................................ G09B 9/08
[58] Field of Search ............... 35/12 R, 12 B, 12 N, 35/12 G; 2/2, 6, 8, 12; 340/228 S; 40/52 R, 130 L; 350/160 LC; 315/134

[56] References Cited

UNITED STATES PATENTS

| | | | |
|---|---|---|---|
| 2,572,656 | 10/1951 | Ortenburger | 35/12 B |
| 3,281,965 | 11/1966 | Irwin | 35/12 B |
| 3,631,411 | 12/1971 | Kosonocky | 340/173 LS |
| 3,636,542 | 1/1972 | Apple | 340/228 S |
| 3,668,861 | 6/1972 | Mitsui | 350/160 LC X |
| 3,873,804 | 3/1975 | Gordon | 2/8 X |
| 3,942,270 | 3/1976 | Hoyt et al. | 35/12 N |

OTHER PUBLICATIONS

*Variable–Transmittance Visor For Helmut Mounted Display;* Dobbins, J. P.; Oct. 24, 1973.

*Primary Examiner*—Richard C. Pinkham
*Assistant Examiner*—Vance Y. Hum
*Attorney, Agent, or Firm*—Larry Michael Jarvis

[57] ABSTRACT

An instrument flight training hood including a voltage-controlled, liquid crystal viewing lens operable to a first state of transparency when a wearer is viewing the instrument control panel of his aircraft and operable to a second state of opacity to instantaneously occlude viewing when wearer changes his line of vision outside of the aircraft. A uniform passageway recessed within the hood directionally communicates light received from an area of space substantially along the wearer's line of sight, to a photocell for lens state actuation responsive to a manually preset light intensity threshold. A manual switching arrangement permits maintenance of lens transparency to provide vertigo simulation capabilities upon flight landing approach whereby wearer changing his line of sight outside of the aircraft to occlude his viewing, and thereafter manually switching the lens to its transparent state enters a condition of vertigo.

14 Claims, 4 Drawing Figures

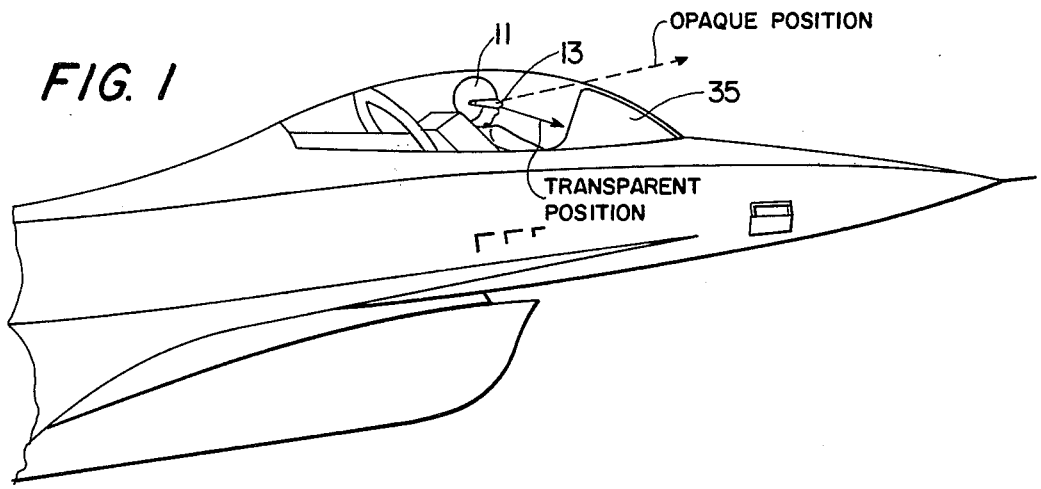
FIG. 1
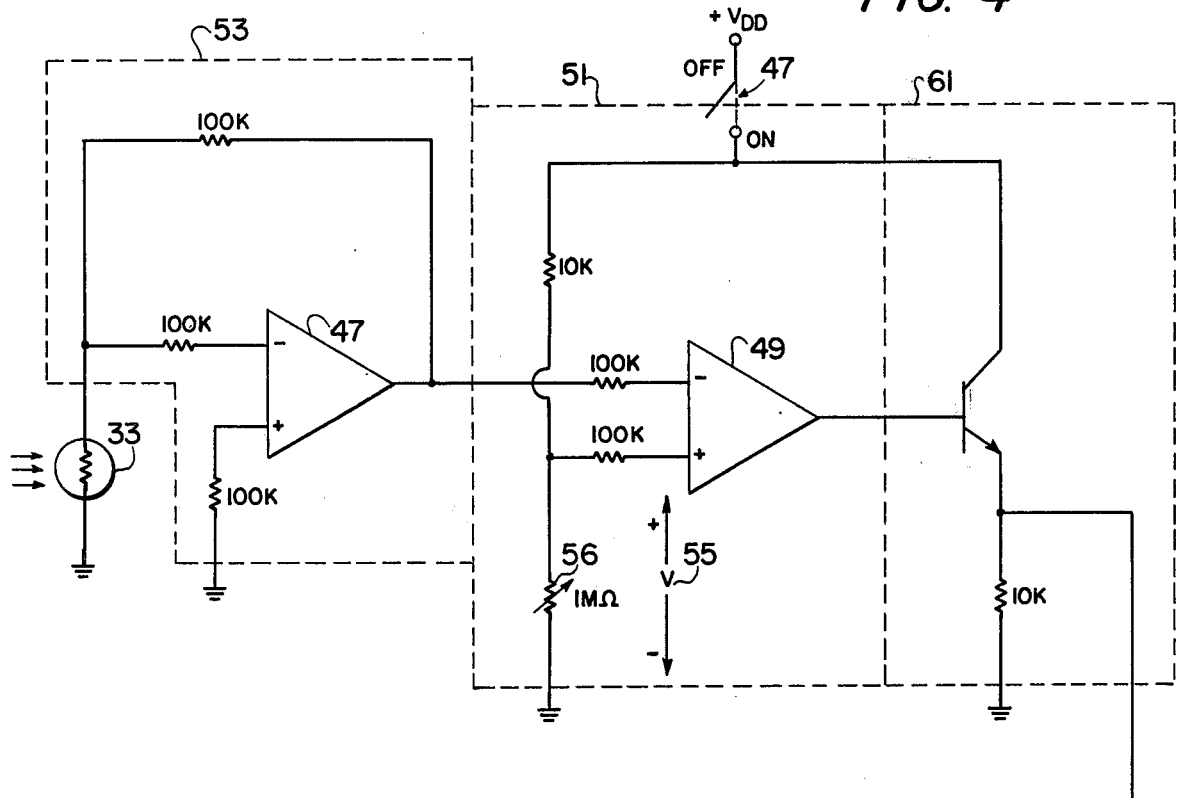
FIG. 4
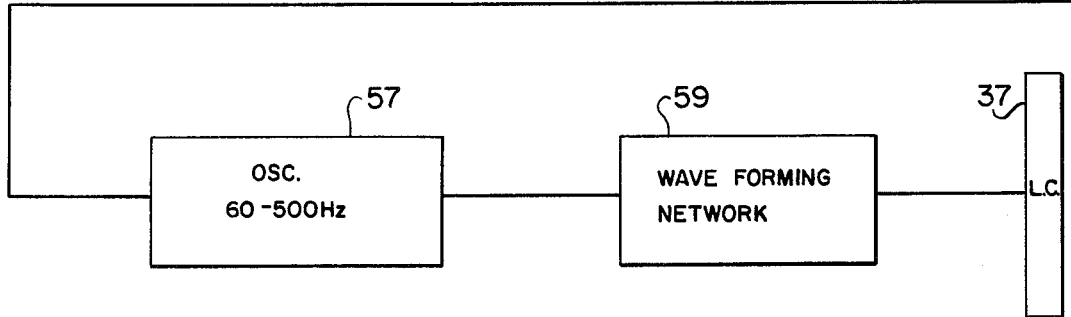

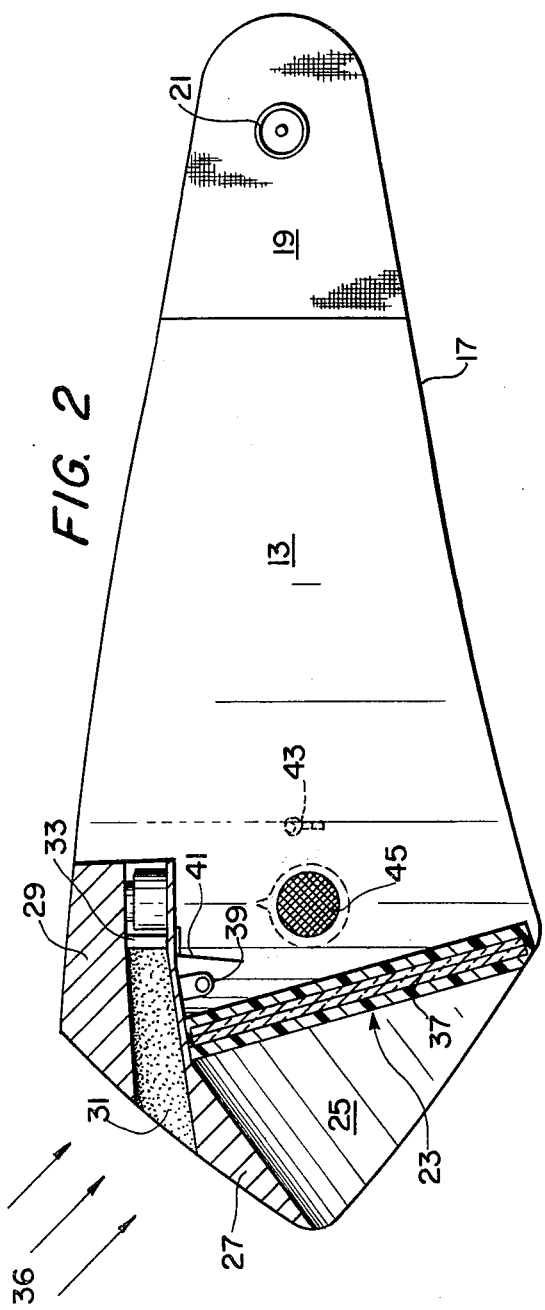
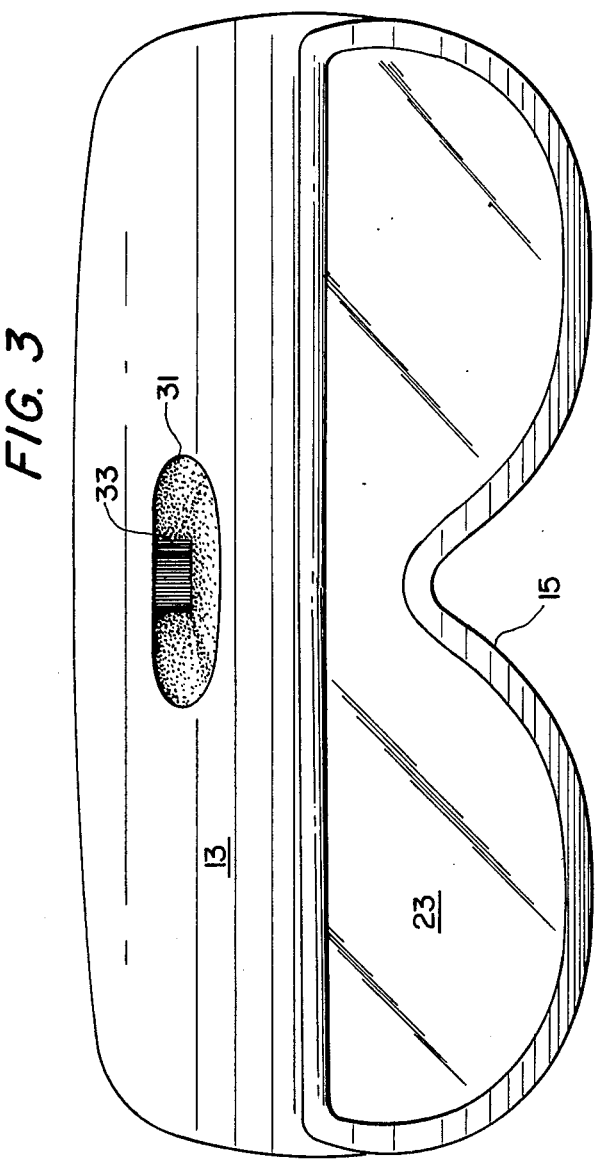

FLIGHT TRAINING HOOD

BACKGROUND OF THE INVENTION

1. Field of the Invention

The invention relates to an instrument flight training hood for preventing an aircraft pilot from viewing outside his aircraft during instrument control flight instruction, and more particularly, to such a flight hood which facilitates simulation of inflight vertigo.

2. Description of the Prior Art

In the area of inflight training, a student pilot must be trained to fly blind in bad weather. Pilots are required to have a minimum number of hours of flight instruction under simulated blind flying conditions before receiving a private or commercial license, or military rating to fly aircraft. Such training is a necessity to pilots who suddenly or inadvertently fly into bad weather conditions.

Flight training hoods have been designed to limit the wearer's field of view to only the instrument panel and immediate cockpit area. Such view limiting devices generally include elongated structures surrounding the pilot's line of vision for constriction thereof, blocking side and upper peripheral sight. Such devices are typified by U.S. Pat. No. 3,225,459 issued to L.L. Wilstein on Dec. 28, 1965 and U.S. Pat. No. 3,392,461 issued to A. Jenison on July 16, 1968.

Such flight hoods do not totally enclose or mask the wearer's line of vision in order to provide a safety factor which insures that the pilot can direct his vision outside the craft in the case of an emergency. However, to accomplish this factor, the hood's elongated structure extending in front of the operator's face becomes awkward and clumsy during flight and may cause eye straining or neck fatigue to support such apparatus. Also, the instructor must depend upon the wearer's trustworthiness during a testing and learning situation to purposefully keep his head substantially level.

Also, where the pilot inadvertently views outside of the aircraft, he would transition to VFR (visual flight rules) and must immediately transition back to IFR (instrument flight rules) as he looks back into the aircraft. This causes a disorientation to the pilot, promoting a time delay factor due to transition reorientation time. This psychological-type problem occurs with inadvertent viewing using the above-mentioned prior art devices.

Lens fogging-type devices including liquid crystals and other similar means have not been considered nor utilized in the flight hood art because of a lack of mode of operation therein and because of the previously mentioned safety factor. Although such lens devices have been utilized in helmet-type gear, see for example U.S. Pat. No. 3,873,804 issued to M. Gordan on Mar. 25, 1974 and U.S. Pat. No. 3,409,909 issued to D.D. Scott et al. on Nov. 12, 1968, the functioning of such devices are not compliant to the flight training hood art. Such devices are responsive to a bright flash of light that occurs during wearer viewing. However, in the flight training environment all stimuli including the ambient light in the cockpit are constant, having no apparent abrupt stimulus occurring at the time the desired fogging should take place.

Therefore, it would be highly desirable to provide a flight training hood having the ease and convenience of an unawkward structure including the quickness of an automatic lens system in which the lens would instantaneously operate in relation to the wearer's positioning of his line of vision.

SUMMARY OF THE INVENTION

It is therefore an object of this invention to provide a flight training hood having a bistable lens system operable to a state of transparency as the pilot views the instrument control panel of his aircraft and instantaneously operable to a state of vision occlusion responsive to the pilot switching his vision to outside of the aircraft.

It is further an object of this invention to provide maintenance of lens transparency in the case of emergency or necessary viewing for overriding the lens control system.

It is a further object of this invention to provide flight helmet conformance to a planar lens configuration for instantaneously occluding the wearer's line of sight when the same is directed outside of the aircraft.

It is yet another object of this invention to provide a flight training hood operable to simulate an inflight vertigo condition by operation of wearer.

The objectives of this invention are accomplished in a hood enclosure having a bistable voltage controlled lens system disposed transverse to the line of wearer's vision being operable to a first state of transparency and a second state of opacity. The intensity of light directed substantially along the line of wearer's vision is monitored to switch states of the lens system to transparency when wearer is viewing the instrument control panel of his aircraft, and to instant opacity when the wearer is viewing outside of the aircraft. The hood includes a switching control for maintenance of the hood in a state of transparency providing a safety factor and further for providing vertigo simulation upon landing approach by wearer changing his line of sight outside of the aircraft to occlude his viewing, and thereafter manually switching the lens to its transparent state.

Other objects, features and advantages of the invention will be readily apparent from the following description of the preferred embodiment taken in conjunction with the appended claims, and accompanying drawings.

BRIEF DESCRIPTION OF THE DRAWINGS

FIG. 1 is an illustration of a pilot utilizing the flight training hood of the present invention.

FIG. 2 is a cross sectional side view in part of the flight hood of the present invention.

FIG. 3 is a front view of the invention of FIG. 1.

FIG. 4 is a circuitry diagram of an embodiment of the present invention.

DESCRIPTION OF THE PREFERRED EMBODIMENT

As illustrated in FIG. 1, the preferred flight hood embodiment of the present invention includes a flight helmet 11 worn as a covering surrounding the pilot's head leaving the face area of the helmet substantially open. A visor member 13 secured to the outer sides of the flight helmet, wraps around the face of the helmet to enclose the pilot's vision. A lower edge 15 of the visor (FIG. 3) circles the bridge of the wearer's nose and contacts his upper cheek bones to block out unwanted light which may enter under the visor.

As seen in FIG. 2, the visor 13 has side members 17 for extending back along the sides of the flight helmet and narrows to an elastic portion 19 formed integral therewith and containing metal snaps or other securing devices 21 to be received by the helmet 11. The elastic side portions permit the pilot to place the visor over his eyes pulling the side snaps 21 against the elastic bias and securing the snaps to the helmet 11, providing a secure fit of the visor over the pilot's eyes.

A visor lens system 23 formed from a liquid crystal 37 is secured within the visor and set transverse to the pilot's line of sight. The lens is recessed within the visor having blinder side sections 25, and a blinder bill section 27 projecting from the lens to block the pilot's peripheral top and side views. The bill section 27 depends anteriorly of the wearer's line of sight and is set transverse thereto for checking the operator from viewing higher without a corresponding upward movement of the operator's head. The bill section operates to discontinue upward eyeball rotation at a certain eyeball position and to engage movement of the operator's neck for further continuous upward eye searching. This same function of head rotation engagement for checking the wearer's upper peripheral vision without a corresponding head rotation may be performed by positioning the viewing lens somewhat lower in height with respect to the line of vision; thus a continued upward eyeball rotation will be checked as the wearer's vision climbs above the lens into the helmet.

The particular head gear configuration may take on other forms as may suggest themselves to those skilled in the art, in which a viewing lens is set transverse to the wearer's line of sight permitting a visual communication only through the viewing lens. However, it should be appreciated that this particular embodiment of the invention provides original features and is particularly useful in jet aircraft where the pilot's head gear resembles that of the helmet 11.

A light intensity system generally referred to by the numeral 29 is provided for sampling a separate area of space to monitor direct light radiation intensities coming therefrom. A passageway or channel member 31 is recessed within the visor 13 above the viewing lens 23 communicating the outside of the visor with a photocell 33. The channel 31 is shaped to directionally receive direct light radiation from an area of space just above the wearer's line of sight or, if desired, at an angle thereto where intersection takes place at or above operator's vision extending just over the instrument panel 35 (FIG. 1), or if desired along the line of sight. For purposes of brevity and claim language, these directional settings of light reception by channel 31 will be referred to hereinafter as "substantially along the line of sight" and indicates a direction of receiving light intensities just above or along the wearer's line of sight when the wearer is viewing outside the aircraft.

The bill section 27 as previously described cooperates with the locating of channel 31 by establishing the wearer's line of sight at which the movement of his neck (and thus the visor 13) must be commanded for a further upward viewing by the wearer.

As seen in FIG. 2, light entering from outside the cockpit, generally indicated by numeral 36, is not directly received by the photocell 33 but is blocked by channel member 31. The inside walls of the channel 31 may be colored dark, or a light absorbing material or paint may be applied to the walls to further enhance directional light reception. However, an initial adjustment of the control circuitry, as described hereinafter, provides adequate establishment of a directional light reception by the photocell 33.

The photocell 33 is responsive to received light intensities for producing a corresponding voltage output the magnitude of which is determined by the magnitude of light intensities received. This voltage output from photocell 33 is utilized to instantaneously operate the viewing lens system 23.

Viewing lens system 23 is considered to be a voltage controlled, bistable lens system having a first stable state of transparency, and a second stable state of opacity. In the preferred embodiment the lens system 23 includes a liquid crystal lens 37, a light emitting diode (LED) 39 and light shield 41. Liquid crystals are well-known devices which may be used to instantaneously switch from a light transmissive state to a light obscuring state upon the application of a voltage. The liquid crystal lens 37 is maintained in a transparent state until a voltage is applied thereto, whereby the lens instantaneously changes states and LED 39 is simultaneously enabled to reflect light upon the lens providing opaqueness to the lens system preventing the pilot from seeing therethrough. A light shield 41 is provided to shield direct light from the LED to the operator's eyes.

A control circuitry as shown in FIG. 4 operates the lens system for switching the states thereof according to a voltage output from photocell 33. The circuitry includes two operational amplifiers 47, 49 which cooperate to form a voltage comparator 51 and amplification network 53 for comparing the voltage output of the photocell 33 with a variable voltage reference 55. A rheostat 56 is operable to vary the voltage reference for establishing a minimum photocell output necessary to actuate the lens system for instantly switching to its opaque state. The rheostat 56 is coupled to a control knob 45 positioned on the outside of visor 13 (FIG. 2) for manual adjustment of the control circuitry by the wearer.

Initially the pilot adjusts the control knob 45 to preset the lens for switching opaque just prior to wearer's vision climbing above the control panel. When setting the rheostat, the pilot directs his line of vision at the control panel then adjusts the rheostat with the lens in an opaque state until the lens turns transparent. Now, viewing any direct light intensity brighter than the control panel will fog his lens. Thus, the control knob 45 provides for adjusting the lens system for different actuating levels on days of different brightness.

Referring again to FIG. 4 a switch 61 is operable upon a voltage output of comparator 51 for driving an oscillator 57 and waveforming network 59, responsive to the light threshold being overcome. Waveforming network 59 impresses the necessary voltage waveform onto the liquid crystal 37 for actuation thereof, as understood by those familiar with liquid crystals. The switch 51 may also serve to drive LED 39 during lens actuation.

The invention, of course, is not limited to the electrical circuitry shown, rather the electrical circuitry is one embodiment thereof, illustrating an electrical circuitry responsive to the magnitude of direct light intensity received by a photocell for instantaneously actuating a liquid crystal lens to its opaque state whenever a preset minimum light intensity is received.

An ON-OFF switch 43 disposed on the outside of visor 13 is operatively coupled to the control circuitry to enable the wearer to manually set the lens system in its transparent state. The ON-OFF switch 43 may, for example, disconnect the photocell output from the liquid crystal lens 37 when in the OFF position, as shown in FIG. 4. The ON-OFF switch 43 provides a safety factor to override the system in case of an emergency or other necessary viewing, and also provides a necessary control for use of the flight hood of the present invention to simulate a flight vertigo condition in pilots.

Flight vertigo simulation is possible on landing approaches. With a state of deceleration and with the pilot viewing the control panel, the pilot changes his line of sight outside of the aircraft to fog the lens occluding his viewing. Shortly thereafter, the pilot manually switches the ON-OFF switch to its OFF position setting the lens to its transparent state. The pilot immediately experiences vertigo.

It should be understood, of course, that the foregoing disclosure relates to a preferred embodiment of the invention and that other modifications or alterations may be made therein without departing from the spirit or scope of the invention as set forth in the appended claims.

What is claimed is:

1. A flight training hood for limiting the vision of a pilot to the instrument control panel of his aircraft, comprising: hood means;

bistable, voltage controlled, lens means suitably secured to said hood means in a transverse relationship with respect to the line of sight of a wearer thereof, said lens means having a first state of transparency permitting the wearer to visually communicate therethrough, and operable to a second state of opacity for affecting visual communication;

light receiving transducer means operatively associated with the movement of said hood means for monitoring light from a predetermined area of space with respect to said hood means;

means for channeling light to said light receiving means, for restricting the reception of light by said light receiving means to directional light reception and for receiving directional light from an area of space lying substantially along a predetermined line of sight of the wearer;

electrical circuitry means cooperable with said light receiving means for voltage controlling said lens means, said circuitry means including means for providing a reference level corresponding to substantially the light intensity coming from the control panel of the aircraft and said circuitry means actuating said lens means to said second state responsive to a light intensity monitored by said light receiving means greater than said light intensity corresponded by said reference level, said lens means remaining in said first state with monitored light intensities below or equal to said light intensity corresponded by said reference level.

2. A flight training hood according to claim 1 and further including vision checking means for checking the wearer's peripheral vision in the area of said predetermined line of sight to substantially said predetermined line of sight to engage movement of said hood means for a greater peripheral viewing by the wearer.

3. A device according to claim 2 wherein said vision checking means includes a bill section projecting outwardly from above said lens means.

4. A device according to claim 1 and further including manual switching means for maintaining said lens means in said transparent state despite the level of intensity monitored by said light receiving means.

5. A flight training hood for limiting the vision of a pilot to the instrument control panel of his aircraft, comprising:

hood means;

bistable, voltage controlled, lens means suitably secured to said hood means in a transverse relationship with respect to the line of sight of a wearer thereof, said lens means having a first state of transparency permitting the wearer to visually communicate therethrough, and operable to a second state of opacity for affecting visual communication;

directional light receiving means operatively associated with the movement of said hood means, for monitoring directional light coming from a predetermined area of space with respect to said hood means, said predetermined area of space lying substantially along a predetermined line of sight of the wearer;

electrical circuitry means cooperable with said light receiving means for voltage controlling said lens means, said circuitry means including means for providing a reference level corresponding to substantially the light intensity coming from the control panel of the aircraft and said circuitry means actuating said lens means to said second state responsive to a light intensity monitored by said light receiving means greater than said light intensity corresponded by said reference level, said lens means remaining in said first state with monitored light intensities below or equal to said light intensity corresponded by said reference level; and vision checking means for checking the wearer's peripheral vision in the area of said predetermined line of sight to substantially said predetermined line of sight peripheral viewing by the wearer.

6. A device according to claim 5 wherein said vision checking means includes a bill section projecting outwardly from above said lens means.

7. A device according to claim 6 wherein said bill section projects transversely with respect to said predetermined line of sight.

8. A device according to claim 5 wherein said vision checking means is formed by a low positioning of said lens means with respect to the wearer's line of sight, for causing the wearer's area of vision to be less above than that below a level eyeball line of sight.

9. A device according to claim 5 wherein said reference level is manually settable.

10. A device according to claim 5 wherein said lens means includes a liquid crystal lens.

11. A device according to claim 5 wherein said directional light receiving means includes: light receiving transducer means; and means for channeling light to said light receiving transducer means for restricting the reception of light by said light receiving means to directional light reception.

12. A flight training hood for limiting the vision of a pilot to the instrument control panel of his aircraft, comprising:

hood means;

bistable, voltage controlled, lens means suitably secured to said hood means in a transverse relationship with respect to the line of sight of a wearer thereof, said lens means having a first state of transparency permitting the wearer to visually communicate therethrough, and operable to a second state of opacity for affecting visual communication;

directional light receiving means operatively associated with the movement of said hood means, for monitoring directional light coming from a predetermined area of space with respect to said hood means, said predetermined area of space lying substantially along a predetermined line of sight of the wearer;

electrical circuitry means cooperable with said light receiving means for voltage controlling said lens means, said circuitry means including means for providing a reference level corresponding to substantially the light intensity coming from the control panel of the aircraft and said circuitry means actuating said lens means to said second state responsive to a light intensity monitored by said light receiving means greater than said light intensity corresponded by said reference level, said lens means remaining in said first state with monitored light intensities below or equal to said light intensity corresponded by said reference level; and manual switching means for maintaining said lens means in said transparent state despite the level of intensity monitored by said light receiving means.

13. A device according to claim 12 wherein said switching means is disposed on the outside of said hood means for manual switching by the wearer thereof.

14. A flight training hood for limiting the vision of a pilot to the instrument control panel of his aircraft, comprising:

hood means;

bistable, voltage controlled, liquid crystal lens means suitably secured to said hood means in a transverse relationship with respect to the line of sight of a wearer thereof, said lens means having a first state of transparency permitting the wearer to visually communicate therethrough, and operable to a second state of opacity for affecting visual communication, said lens means further including: a light emitting diode positioned to the wearer's side of said lens means for reflection thereon providing opaqueness when said lens is in said second state; and a light shield positioned to obstruct direct light from said light emitting diode passing to the eyes of the wearer;

directional light receiving means operatively associated with the movement of said hood means, for monitoring directional light coming from a predetermined area of space with respect to said hood means, said predetermined area of space lying substantially along a predetermined line of sight of the wearer; and electrical circuitry means cooperable with said light receiving means for voltage controlling said lens means, said circuitry means including means for providing a reference level corresponding to substantially the light intensity coming from the control panel of the aircraft and said circuitry means actuating said lens means to said second state responsive to a light intensity monitored by said light receiving means greater than said light intensity corresponded by said reference level, said lens means remaining in said first state with monitored light intensities below or equal to said light intensity corresponded by said reference level.

* * * * *